US008116257B2

(12) United States Patent
Margolis

(10) Patent No.: US 8,116,257 B2
(45) Date of Patent: Feb. 14, 2012

(54) METHOD AND SYSTEM FOR CALCULATING A LOCAL TIME FOR A USER EQUIPMENT IN AN INTELLIGENT NETWORK

(75) Inventor: Michael Margolis, Allen, TX (US)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 908 days.

(21) Appl. No.: 12/123,690

(22) Filed: May 20, 2008

(65) Prior Publication Data

US 2009/0290571 A1   Nov. 26, 2009

(51) Int. Cl.
H04B 7/212 (2006.01)
H04B 7/00 (2006.01)
H04J 3/06 (2006.01)
H04L 12/56 (2006.01)

(52) U.S. Cl. .................. 370/324; 370/350; 370/395.62; 370/503; 455/502

(58) Field of Classification Search .......... 370/310–350, 370/236.1, 395.62, 449, 453, 457–458, 503, 370/509–514; 455/422.1, 456.1–461, 502, 455/515; 375/145, 219, 260, 358, 366
See application file for complete search history.

(56) References Cited

U.S. PATENT DOCUMENTS

| 6,094,672 | A  | * | 7/2000  | Willie et al. ................. 709/202 |
| 6,223,050 | B1 | * | 4/2001  | Roberts, Jr. ................... 455/425 |
| 7,916,580 | B2 | * | 3/2011  | Nalla et al. ...................... 368/21 |
| 8,009,519 | B2 | * | 8/2011  | Jazra et al. ...................... 368/47 |
| 2002/0186619 | A1 | * | 12/2002 | Reeves et al. ................... 368/47 |
| 2008/0165626 | A1 | * | 7/2008  | Urano .............................. 368/47 |
| 2008/0266453 | A1 | * | 10/2008 | Fisher ........................... 348/516 |
| 2009/0219205 | A1 | * | 9/2009  | Jazra et al. ............... 342/357.13 |

* cited by examiner

Primary Examiner — Tri H Phan

(57) ABSTRACT

A method of calculating local time, in an intelligent network, of a subscriber's User Equipment (UE), determines whether a call originates or terminates with the UE, the UTC offset and DST observance indicator for the (G)MSC signaling the intelligent network, and a determination is of whether the UE is in a Problem Area cell site. If the UE is in a Problem Area cell site, the received time and Coordinated Universal Time (UTC) Offset is corrected. A Cell Global Identity (CGI) is used to lookup the UTC Offset and a Daylight Saving Time (DST) observance indicator for the Cell Site. For calls terminating with the UE, if the UE is not in a Problem Area cell site, the VLR serving the UE is used to lookup the UTC offset and DST observance indicator for the subscriber. A time zone delta is applied to the call time of day and the UTC Offset and if DST is in effect, and there is a difference of DST between an MSC serving the UE and the location associated with the UE, a DST delta is applied to call time of day.

16 Claims, 4 Drawing Sheets

METHOD AND SYSTEM FOR CALCULATING A LOCAL TIME FOR A USER EQUIPMENT IN AN INTELLIGENT NETWORK

BACKGROUND OF THE INVENTION

The present invention relates to time and timezone information in Intelligent Networks (IN). More particularly, and not by way of limitation, the present invention is directed to a system and method for calculating a local subscriber's local time more accurately.

Several operators of mobile telephony systems have or plan to introduce peak/off-peak hours for real-time rating of prepaid calls. For GSM network solutions based on the Customized Applications for Mobile network Enhanced Logic (CAMEL) Application Part (CAP), there is a deficiency that can prevent accurately obtaining a subscriber's local time.

Existing real-time solutions requiring the time at the subscriber's locale rely on the time reported to the Service Capability Point (SCP) in a GSM network. The time and time zone information reported in a CAP Initial Data Point (IDP) message is used to calculate whether peak or off-peak hours are in effect. Details of CAMEL can be found in the reference "GSM 02.78: "Digital cellular telecommunications system (Phase 2+); Customised Applications for Mobile network Enhanced Logic (CAMEL Phase 2)—stage 2".

Existing CAMEL based solutions rely on the time and time zone information conveyed in the CAP IDP message to calculate and record the subscriber's calling/called time. However, this time is based on either the serving Mobile Switching Center's (MSC's) location for Mobile Originated (MO) calls or the Gateway MSC's (GMSCs) location for Mobile Terminated MT calls.

In the case of an MO call, it's possible that a cell site serving the subscriber is located in either a different time zone and/or in a time zone that has different rules for the observance of Daylight Saving Time (DST) than the serving MSC. Typically, in the United States (US), this discrepancy could be plus or minus one hour depending on location.

For an MT call where the subscriber is roaming, the discrepancy can be even greater. For example, if a subscriber's GMSC is located on the eastern coast of the US, but the subscriber is roaming on the western coast, the time reported to the SCP could be off by three hours.

These discrepancies can lead to customer confusion, off-peak hours expanded to cover many time zones, increased calls into customer service centers and awards of free calls to prevent customer dissatisfaction. It would be advantageous to have a system and method for providing a more accurate indication of the subscriber's local time that overcomes the disadvantages of the prior art. The present invention provides such a system and method.

BRIEF SUMMARY OF THE INVENTION

An object of the present invention is to provide a method of calculating a subscriber's local time more accurately.

Another object of the present invention is to provide more accurate call detail records (CDRs) used to provide call history information to the subscriber and mobile operators.

In order to calculate the subscriber's local time more accurately, additional information is provided in the form of data lookup tables on either the SCP or the Service Data Point (SDP), depending on the implementation of the prepaid service.

The data tables supplement data received from the telecom network by providing Coordinated Universal Time offset, DST observance indication of the involved MSCs, GMSCs, Visitor Location Registers (VLRS) and Cell Global Identities (CGIs) in the GSM network.

For Mobile Originating (MO) calls, CGI and MSC information received at an Initial Detection Point is used with the table data to determine a time delta to be applied to the network time. When CGI is not found in the tables, the cell having the target CGI and the subscriber's MSC share the same time zone/DST observance and no corrections are necessary.

For Mobile Terminating (MT) calls, either or both the CGI and VLR times could have a delta calculated with respect to the GMSC time reported in the IDP. If a delta is found a new time is used in the calculations. Once the time delta is calculated and applied, the new time can be used in any subsequent rating calculations and for generating any call detail records.

The method of calculating local time, in an intelligent network, of a subscriber's User Equipment (UE) includes determining whether a call originates or terminates and a determination of whether the UE is in a "Problem Area" cell site. In this context, a "Problem Area" is defined as a cell site that is observing a different UTC Offset from its serving MSCNLR. If the UE is in a Problem Area cell site, the received Coordinated Universal Time (UTC) Offset is corrected based on the method described below.

A Cell Global Identity (CGI) is used to lookup the UTC Offset for the Cell Site to check the Daylight Saving Time (DST) observance indicator. If DST is in effect and if there is a difference of DST between the MSC serving the UE (for MO calls) or GMSC (for MT calls) and the Cell Site associated with the UE, then a time zone delta is applied to the call time of day. Also if the UTC Offsets are different, another time zone delta is applied to the call time of day and the UTC Offset. In the case of an MT call, if there is no time difference found between the CGI lookup and the GMSC, a similar check is performed between the VLR serving the UE and the GMSC.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

Figure 1A:
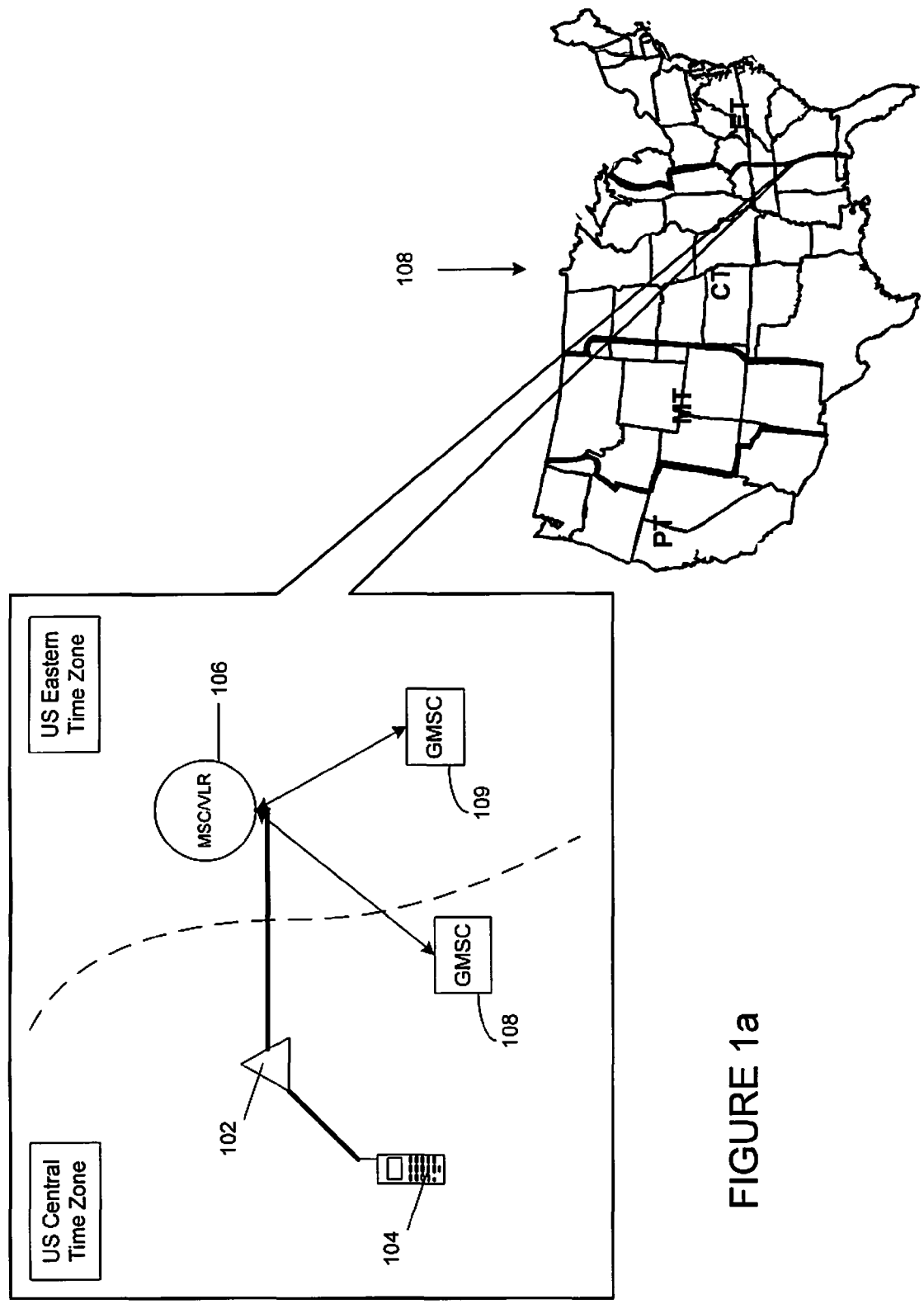
FIG. 1a depicts a problem area as described herein in accordance with an embodiment of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The processes presented herein are not inherently related to any particular computing device or other apparatus. Various systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

The following acronyms and abbreviations are being used in conjunction with the description of the preferred embodiments of the present invention throughout the present description of the exemplary embodiments of the invention:

| | |
|---|---|
| CAMEL | Customized Applications for Mobile network Enhanced Logic |
| CAP | CAMEL Application Part |
| CGI | Cell Global Identification |
| CI | Cell Identity (received as part of the CGI) |
| DST | Daylight Saving Time |
| GMSC | Gateway Mobile Switching Center |
| GSM | Global System for Mobile communications |
| IDP | Initial Detection Point (a CAP message) |
| LAC | Location Area Code (received as part of the CGI) |
| MCC | Mobile Country Code (received as part of the CGI) |
| MF | Mobile Forwarded |
| MNC | Mobile Network Code (received as part o the CGI) |
| MO | Mobile Originated |
| MSC | Mobile Switching Center |
| MT | Mobile Terminated |
| PPS | Prepaid System |
| Problem Area | MSC/VLR whose serving area contains either or both of the following: cell sites in different time zone versus their serving MSC/VLR and cell sites with different rules for observing Daylight Saving Time versus their serving MSC/VLR. |
| SCP | Service Control Point |
| SDP | Service Data Point |
| UTC | Coordinated Universal Time (formerly known as GMT or Greenwich Mean time) |
| VLR | Visitor Location Register |

A subscriber's local time can be calculated more accurately, but additional information is required beyond that usually supplied to an SCP. This information can take the form of data lookup tables on the SCP or a Service Data Point (SDP), depending on the implementation of the prepaid service.

The lookup tables supplement data received from the GSM network in an Initial Detection Point (IDP) by providing a Coordinated Universal Time (UTC) offset and DST observance indication of the MSCs, GMSCs, Visitor Location Registers (VLRs), and Cell Global Identities (CGIs) in the GSM network. The amount of data required can be reduced by using range based lookups when possible and by limiting the time correction to scenarios where the subscriber is in the home operator's network. A table should be created to contain beginning and ending dates of DST in each country for which the time correction will be applied.

For Mobile Originating calls, where a subscriber places a call from a "problem area", the CGI and MSC information received in the IDP is used in conjunction with table data to determine what time delta needs to be applied to the time received from the network. If the CGI is not found in the tables, then it is assumed that the CGI and MSC share the same time zone/DST observance and no corrections are necessary. Including only CGIs that have a time delta with their serving MSC greatly reduces the amount of data necessary.

Alternatively, an indication can be used in the MSC table to indicate whether there are any "problem areas" in the cells served by the MSC.

For Mobile terminating calls, where a subscriber's VLR is in a different location from subscriber's associated Gateway MSC (GMSC), either or both of the CGI and VLR times can have a delta calculated with respect to the GMSC time reported in the IDP. If a delta is found, a new time can then be used in the local time calculations.

Once the time delta is calculated and applied, a new time can be used in any subsequent rating calculations and for the generation of any call detail records (CDRs) that are used to provide call history information to the subscriber and mobile operators.

FIG. 1a depicts a problem area as described herein in accordance with an embodiment of the present invention. Cell site 102, serving subscriber's cellphone 104, is in a different time zone than that of cellphone 102's serving MSC/VLR 106. Time zones are indicated as bold lines on outline map 108 of the United States and the Time Zones (Eastern, Central, Mountain and Pacific) are numbered from right to left.

A Problem Area depicted in FIG. 1a is a serving area that meets the first of two conditions; cell site 102 is in a different time zone than the serving MSC. A second condition, though not shown, can occur in places like Arizona where part of the state observes DST and part of the state does not, or e.g., cell site 102 is located where there are different rules for observing Daylight Saving Time than the rules of the serving MSC.

Figure 1B:
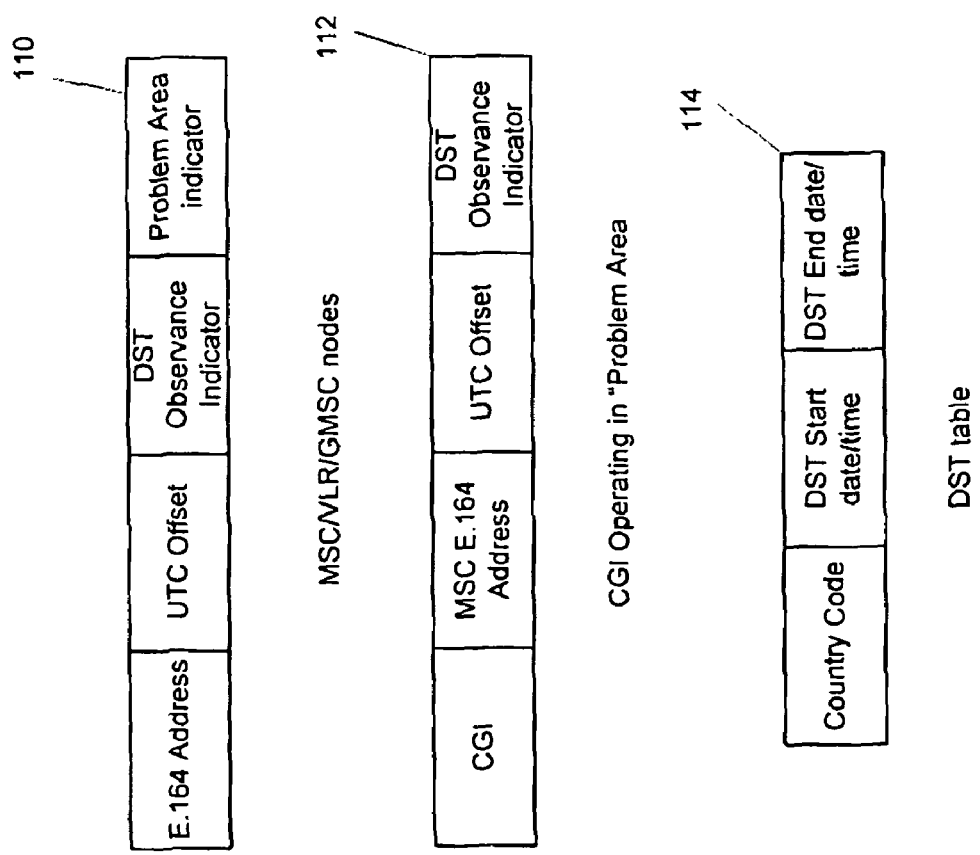
FIG. 1b illustrates three data files (tables) that are used in accordance with the present invention.

A Service Control Point (SCP) typically looks at the cell site first and checks the CGI lookup table (see FIG. 1b). For MT calls, if there is no information in the lookup table the SCP then looks at MSC/VLR 106 and GMSC 109 and compares time offset and DST rules between GMSC 109 and cell 102 to determine whether there is a delta. If the SCP is comparing GMSC 108 and cell 102, they are both located in the same time zone and most likely same DST rules so there will be no delta (an Arizona location might be one of the few places with different rules). The step for working in a problem area is the same whether the call is originated (MO) or terminated (MT) in serving MSC/VLR 106.

The problem area in FIG. 1a depicts the subscriber's MSC being located in the Eastern Time zone. The subscriber is located in a cell site located in the Central Time zone and originates a call. In the IN, the SCP receives IDP with the MSC's Time/UTC offset, the MSC address and the problem cell's Cell Global Identity.

Another mobile originated example locates the MSC in the Mountain Time zone and Daylight Savings time is observed in the location of the MSC (i.e., Mountain Daylight Time, MDT). The subscriber is in a cell site located in the Mountain Time zone, but the cell site doesn't observe DST Oust MST). In this case a problem area exists for the DST difference, but in other cases the problem area can include a Timezone difference or both.

A mobile terminating example may be the subscriber receiving a call from the subscriber's GMSC that is located in the Eastern Time zone and observes DST. The VLR is located in a Mountain Time Zone (e.g., Arizona) area which does not observe DST. In this case the SCP receives IDP with the GMSC's time/UTC offset, the VLR number and the Cell Global identity.

Another mobile terminating example locates the problem cell in an area in the Mountain Time zone that observes DST. The VLR site is located in the Mountain Time zone area that does not observe DST. Thus, for MT calls, both the VLR and the cell can have a different UTC offset from the GMSC.

In Mobile Originated calls, if the subscriber's MSC is in a "problem area" and the CGI is identified as a different time zone/DST observance, then the timestamp/UTC offset is corrected. In Mobile Terminated calls a time delta, if any between the GMSC and VLR, is adjusted. Then the timestamp/GMT offset is adjusted if VLR is in a "problem area" and the CGI is identified as a different time zone/DST observance. In the case of Mobile Forwarded calls, no adjustment is attempted since the CGI is not provided to the SCP.

FIG. 1b illustrates three data files (tables) that are used in accordance with the present invention. The data files are used to implement the present invention and a "best match" or range type lookup can be used to limit the amount of data required. One table is required for MSCNLR/GMSC address based lookups, another table for Cell Site (CGI) based lookups, and a third containing the DST start/end time based on the Country Code digits in the (G)MSC address received in the IDP.

Data file 110 fields that are required for the MSC/VLR/GMSC nodes in the network for which the time correction can be applied are: E. 164 address; UTC Offset, and a DST Observance indicator. If a "best match" lookup is used, it is not necessary to store separate entries for each address in the table.

Similarly, data file 112 for each CGI in the network that is operating in a "Problem Area" is also required with the following data: CGI that is composed of MCC, MNC, LAC and CI; MSC E.164 address where the cell is located, UTC offset and DST Observance indicator. In practical applications, the MSC E.164 address does not need to be the complete address, but rather, only the most significant portion necessary to determine the appropriate entry in the DST start/end table.

DST table 114 would also be required containing the country code, DST start date/time and DST end date/time for any country where a time correction is needed. It is assumed that Daylight Savings Time begins and ends at the same local time for every location within a single country that observes DST, e.g., DST always begins and ends at 2 A.M. local time in the US.

Figures 2A, 2B:
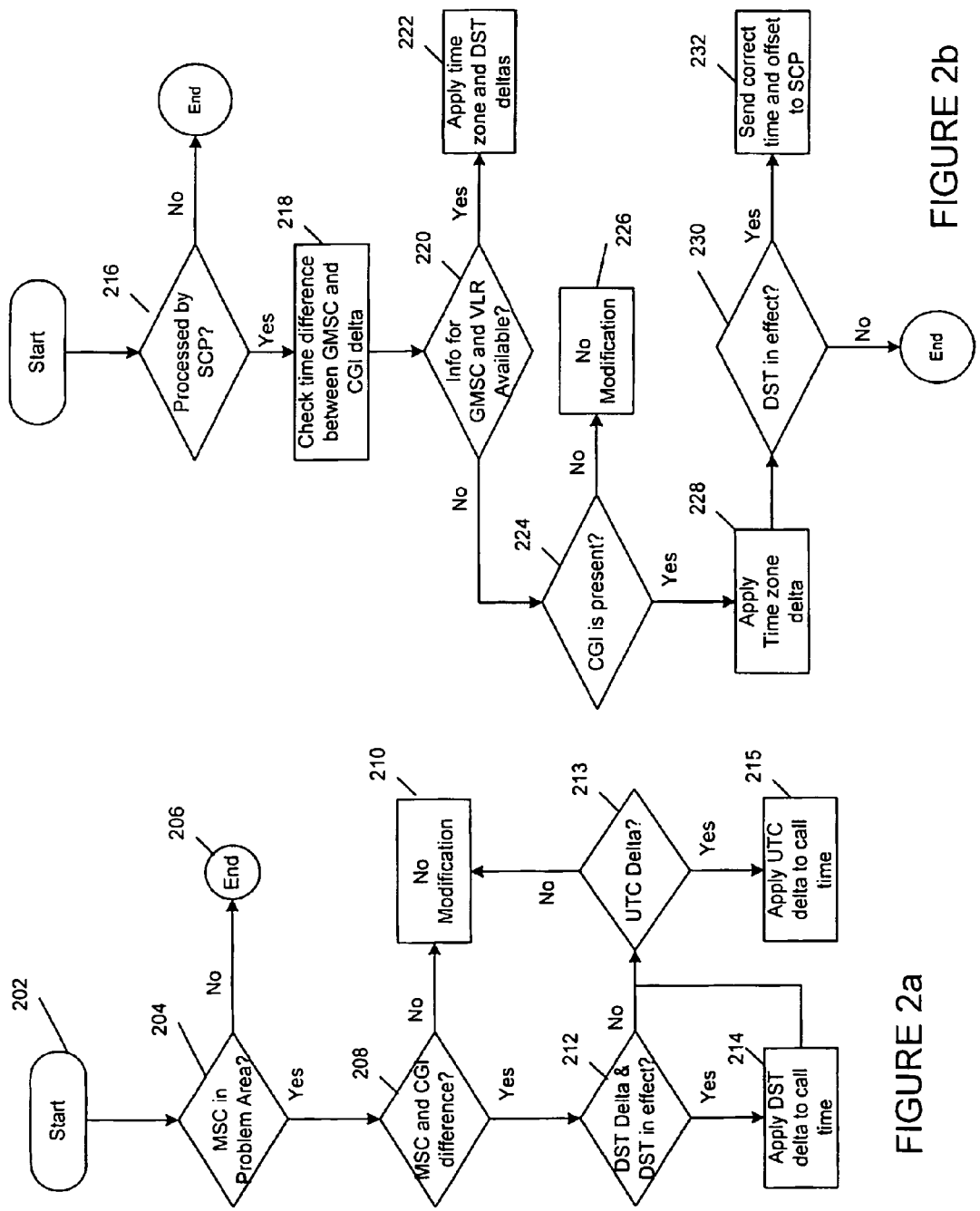
FIG. 2a illustrates a process for correcting time and UTC offset for Mobile Originated calls according to an embodiment of the present invention.
FIG. 2b depicts a process for correcting time and UTC offset for Mobile terminated calls according to an embodiment of the present invention.

FIG. 2a illustrates a process for correcting time and UTC offset for Mobile Originated calls according to an embodiment of the present invention. In an intelligent Network, an SCP passes the address of the MSC serving a particular subscriber and CGI information of the cell in which the subscriber is located to an associated SDP (step 202). Step 202 is performed only when time adjustments are performed by the SDP; otherwise the process is executed utilizing the SCP for all of the steps from step 202 onwards. The process then proceeds to step 204 and a check is made whether the MSC in a Problem Area. If not, the process moves to step 206 and the process ends. If the MSC is determined to be in a problem area, the process moves to step 208 where the Cell Global Identifier (including MCC, MNC, LAC, CI) is used to look up a UTC Offset for the Cell site (granularity should be the same as UTC offset, i.e., fifteen minutes in accordance with CAP specification) and a DST Observance Indicator. If there is no CGI record, then it can be assumed that the subscriber is not located in a "Problem Area" and the process moves to step 210 at which time information is not modified. If there is a CGI record, the MSC Address is used to lookup the UTC Offset and DST Observance Indicator in table 110.

The process checks to determine whether there is a delta between the MSC and CGI (step 208). If there are no differences, the process moves to step 213. Otherwise the process checks for a difference in the DST observance indicators (step 212). The they are the same, the process moves to step 213 and the process then checks whether there is a UTC delta. I not, the process goes to step 210 and there are no modifications. If there is a UTC delta, the UTC delta is applied to the call time.

Returning to step 212, if there is a difference of DST observance between the MSC and the Cell Site, the process moves to step 214 where a DST delta of −1 hour is applied if DST is in effect for the MSC and +1 hour is applied if DST is in effect for the CGI, which is then applied to call time.

The process continues to step 213, which determines whether there is a UTC delta. If there is no UTC delta the process proceeds to step 210 and no modification is made. If there is a UTC delta, the process moves to step 215 and applies a time zone delta, the difference between the MSC's UTC offset and the cell's UTC offset, to the call time and UTC offset. If the SDP performs the actual time adjustments instead of the SCP, the corrected time and the UTC offset is returned to the SCP. Even if DST is not in effect, there can be a UTC offset difference in the MSC and CGI that needs to be corrected.

FIG. 2b depicts a process for correcting time and UTC offset for Mobile Terminated calls according to an embodiment of the present invention. A two part process is required in which one part will address the VLR address being in a different time zone than the GMSC and the other part will address the case where the VLR serves cell sites in multiple time zones. Since the majority of CGIs are not expected to be in problem areas, the first steps are usually all that is necessary.

After the start of the process, a determination is made whether the procedure is to be implemented by the SCP (step 216). If not the SCP passes the GMSC address, VLR number and CGI information the SDP. If so, all the remaining steps are processed in the SCP. A time difference from the GMSC and CGI delta is checked (step 218). The time zone and DST observance for the GMSC address is looked up as is the time zone and DST observance for the VLR number (step 220). If information is available, the time zone delta, if any, is applied to call time and UTC offset. If Daylight Savings Time is in effect and there is a difference of DST observance between the GMSC and VLR, DST delta is applied to call time (step 222). The process then branches to step 224 to determine if CGI is present.

If CGI is present (the CGI lookup is only applicable when the VLR number indicates a "Problem Area" and can only be performed if CGI is present) the MCC, MNC, LAC and CI are used to determine: UTC Offset for the Cell Site, DST Observance indicator (step 226). If there is no difference for the CGI then no time information is modified based on the CGI (step 226). If there is a difference, the process applies a time zone delta, if any, to call time and UTC offset (step 228). If DST is in effect and there is a difference of DST observance between the MSC and the Cell site, DST delta is applied to the call time (step 230). If the SDP is performing the process, the corrected time and UTC offset is then returned to the SCP (step 232).

For mobile forwarded (MF) calls, no modifications to the timestamp and UTC offset are performed. The location information parameter is not generally received in the IDP message, which precludes the detection of cell sites that are in a different time zone than the serving MSC. Also, the trigger time should match the serving MSC Address, so the roaming issues present for mobile termination is not a factor.

Figure 3:
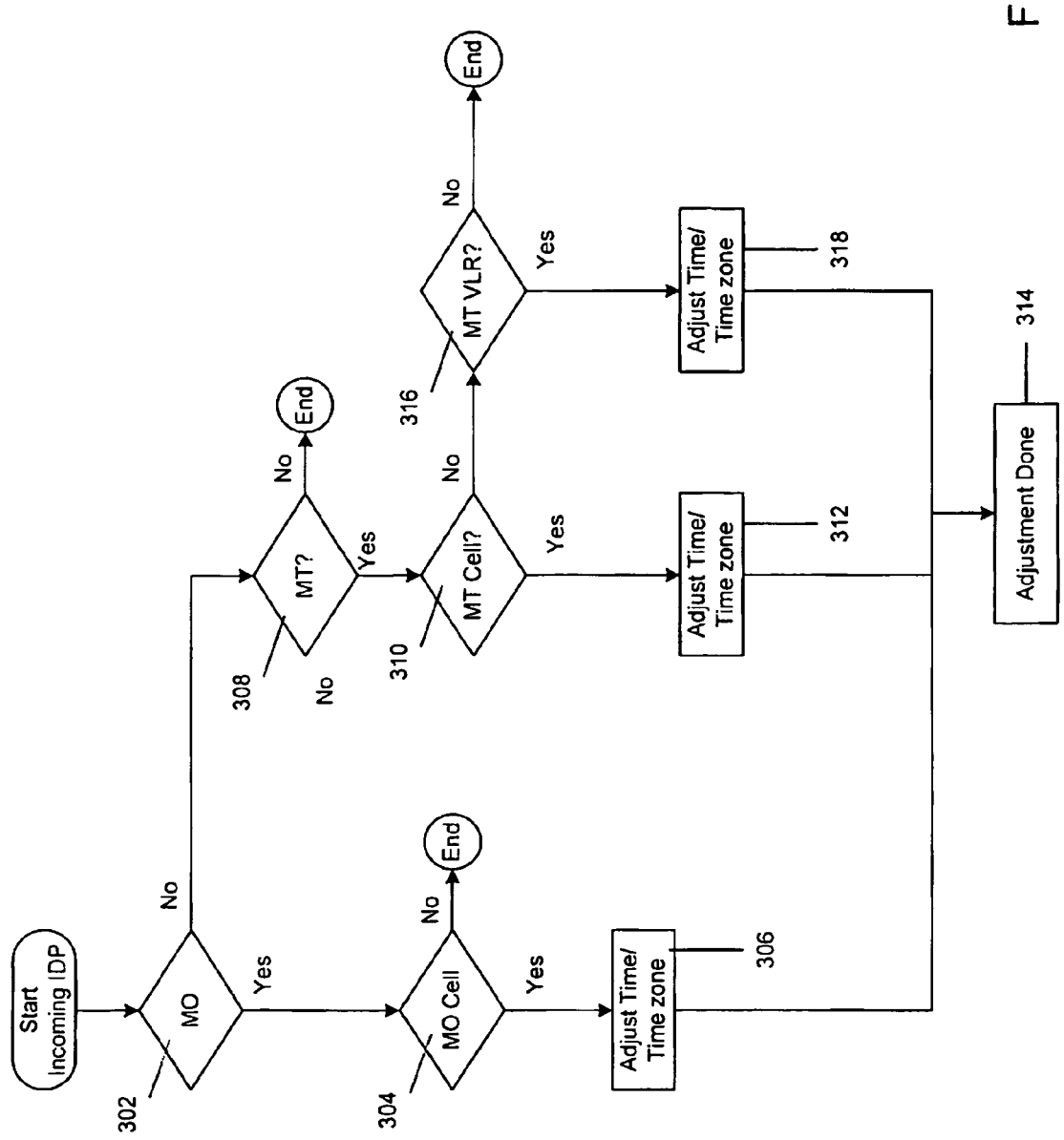
FIG. 3 illustrates a process for calculating a subscriber's local time in accordance with a preferred embodiment of the present invention.

FIG. 3 illustrates a process for calculating a subscriber's local time in accordance with a preferred embodiment of the present invention. The process begins with a subscriber's local time and time zone information being reported in a CAMEL Application Part (CAP) Initial Data Point (IDP)

message. The process continues when a determination is made whether the location is for a Mobile Originated (MO) call or a Mobile Terminated (MT) call (step 302). If the determination is made that the location is for a MO call, the process proceeds to step 304 where a determination is made whether the UE is originating the call from problem area by checking for the presence of a CGI record. If there is a CGI record, the process moves to step 306 wherein tables associated (address based lookup, CGI based lookups and DST start/end time) with the problem area are consulted to adjust the time and time zone of the subscriber's UE. The process moves then to step 314 wherein the adjustment is made to the subscriber's local time.

Returning to step 302, if the determination is made that the call is not a Mobile Originating call, the process moves to step 308 where a determination is made whether the call is a Mobile Terminating (MT) call. If the message is not a MT call, e.g., a Mobile Forwarded call, the process ends. If the determination is made that the call is a MT call the process proceeds to step 310 where a determination is made whether the call is terminating in a cell that is located in a problem area. If the determination is made that the call is not terminating in a problem area cell the process then proceeds to step 316. A determination is then made whether the call is terminating in a VLR in a problem area and if not, the process ends.

Returning to step 316, if the call is terminating at the subscriber's UE that is served by a VLR that is in a problem area, tables associated with the VLR in the problem area are consulted in step 318 regarding UTC and DST for the VLR and GMSC in order to make the appropriate changes in time and time zone. The process is then considered complete in step 314.

Returning to step 310, if the call is terminating with the subscriber's UE in a cell that is in a problem area, tables associated with the cell in the problem area are consulted regarding UTC and DST for the CGI and GMSC. Next the process moves to step 312 to make the appropriate changes in time and time zone and then the process is considered complete (step 314).

As will be recognized by those skilled in the art, the innovative concepts described in the present application can be modified and varied over a wide range of applications. For instance, though the examples listed here are applied to voice calls, a charging control node that interfaces with the core network can just as easily be used to charge for data or for Instant Messaging Service messages. Additionally Multimedia Message Service Centers and Short Message Service Center may be used in facilitating the disclosed method in the appropriate systems. Accordingly, the scope of patented subject matter should not be limited to any of the specific exemplary teachings discussed above, but is instead defined by the following claims.

What is claimed:

1. A method of calculating local time, in an intelligent network, of a subscriber's User Equipment (UE), the method comprising the steps of:
   determining whether the UE is in a Problem Area cell site and if so,
      using a Cell Global Identity (CGI) to lookup the UTC Offset for the problem area Cell Site;
      checking a Daylight Saving Time (DST) observance indicator;
      applying a time zone delta to the call time of day and the UTC Offset; and
   if DST is in effect, and there is a difference of DST between the UE's Gateway Mobile Switching Center (GMSC) or serving MSC and the DST of the problem area Cell Site associated with the UE, applying a DST delta to call time of day.

2. The method of claim 1, wherein the DST delta is −1 hour if the GMSC or the serving MSC is observing DST and +1 hour if the cell site is observing DST.

3. The method of claim 1, wherein the time zone delta is applied to correct a received call time and UTC offset.

4. The method of claim 1, a GMSC or serving MSC being in the same time zone as the problem area Cell Site, further comprising the step of adding the DST delta if the GMSC UTC offset and the problem area Cell site UTC offset are the same.

5. A method, in an Intelligent Network (IN), of calculating local time of a subscriber's User Equipment (UE), the method comprising the steps of:
   determining whether a call terminates with the UE in a Problem Area cell site, which is a cell site having a time difference between the UE and the UE's serving Visitor Location Register (VLR), wherein if the cell site is a Problem area cell site or if the UE is not in a Problem Area cell site but there is a time difference between the VLR and the Gateway Mobile Switching Center (GMSC) handling the call:
   determining the UTC offset and DST observance indicator for the subscriber's location by using either
      a Coordinated Universal Time (UTC) offset and a Daylight Saving Time (DST) observance indicator for the Problem Area cell site or,
      a UTC offset and DST observance indicator for the VLR serving the UE;
   determining a time zone delta by comparing the subscriber's UTC offset and the GMSC's UTC offset; and
   if DST is in effect and there is a DST difference between the GMSC and the subscriber's location, applying a DST delta to call time of day.

6. The method of claim 5, wherein the DST delta is −1 hour if the GMSC is observing DST and +1 hour if the subscriber's location is observing DST.

7. The method of claim 5, wherein a received call time and UTC offset are applied based on the time zone delta.

8. The method of claim 5, a Gateway Mobile Switching Center being in the same time zone as the subscriber, if DST and UTC offset are the same, no delta is added.

9. A system, in an Intelligent Network (IN), for calculating local time of a subscriber's User Equipment (UE), the system comprising:
   a means for determining whether a call from the UE originates in a Problem Area cell site, having a time difference between the UE and the UE's serving Mobile Switching Center (MSC);
   a Service Control Point or a Service Data Point, using Cell Global Identification (CGI), to lookup a Coordinated Universal Time (UTC) offset and a Daylight Saving Time (DST) observance indicator for the Problem Area cell site and determine a time zone delta by comparing the serving MSC's UTC offset and the CGI's UTC offset; and if DST is in effect and there is a DST difference between the serving MSC and the Problem Area cell site associated with the UE, a DST delta is applied to call time of day.

10. The system of claim 9, wherein the DST delta is −1 hour if the serving MSC is observing DST and +1 hour if the cell site is observing DST.

11. The system of claim 9, wherein the call time of day and UTC offset are applied based on the time zone delta.

12. The system of claim 9, a Mobile Switching Center being in the same time zone as the subscriber and if DST and UTC offset are the same, no delta is added.

13. A system, in an Intelligent Network (IN), for calculating local time of a subscriber's User Equipment (UE), the system comprising:
  a means for determining whether the UE is in a Problem Area cell site, which is a cell site having a time difference between the UE and the UE's serving Mobile Switching Center (MSC), wherein if the cell cite is a Problem area cell site:
  a Service Control Point or a Service Data Point, if the call terminates with the UE, using Cell Global Identification (CGI) to lookup a Coordinated Universal Time (UTC) offset and a Daylight Saving Time (DST) observance indicator for the Problem Area cell site;
  a means for determining a time zone delta by comparing the subscriber's UTC offset and the CGI's UTC offset; and
  if DST is in effect and there is a DST difference between the serving MSC and the Problem Area cell site associated with the UE, a means for applying a DST delta to call time of day.

14. The system of claim 13, wherein the DST delta is −1 hour if the serving MSC is observing DST and +1 hour if the cell site is observing DST.

15. The system of claim 13, wherein a received UTC offset is corrected if the received UTC offset is zero.

16. The system of claim 13, a Gateway Mobile Switching Center being in the same time zone as the serving MSC, if DST and UTC offset are the same, no delta is added.

* * * * *